(12) United States Patent
Wu et al.

(10) Patent No.: US 7,570,029 B2
(45) Date of Patent: Aug. 4, 2009

(54) ACTIVE POWER CONDITIONER

(75) Inventors: Chin-Chang Wu, Kaohsiung (TW);
Hung-Liang Chou, Kaohsiung (TW);
Min-Sheng Huang, Kaohsiung (TW);
Han-Sheng Wei, Kaohsiung (TW);
Ya-Tsung Feng, Kaohsiung (TW)

(73) Assignee: Ablerex Electronics Co., Ltd., Hsintien (TW)

( * ) Notice: Subject to any disclaimer, the term of this patent is extended or adjusted under 35 U.S.C. 154(b) by 0 days.

(21) Appl. No.: 11/962,193

(22) Filed: Dec. 21, 2007

(65) Prior Publication Data

US 2008/0253153 A1    Oct. 16, 2008

(30) Foreign Application Priority Data

Apr. 13, 2007   (TW) .............................. 96113044 A (51) Int. Cl.
*G05F 1/70*  (2006.01)
(52) U.S. Cl. ...................................... 323/207
(58) Field of Classification Search .................. 323/207, 323/205, 210
See application file for complete search history.

(56) References Cited

U.S. PATENT DOCUMENTS 4,812,669 A * 3/1989 Takeda et al. ................ 307/105
6,940,188 B2   9/2005 Okuma

* cited by examiner

*Primary Examiner*—Shawn Riley
(74) *Attorney, Agent, or Firm*—Alan Kamrath; Kamrath & Associates PA (57) ABSTRACT

An active power conditioner includes a first power electronic switch set, a second power electronic switch set, a third power electronic switch set, an input filter and an output filter. The active power conditioner can supply a stable AC voltage to a load when a voltage variation occurs at an AC power source by controlling either the second power electronic switch set or the third power electronic switch set via high-frequency switching, and the other power electronic switch sets that are not switched in high frequency are controlled to switch in low-frequency switching.

17 Claims, 5 Drawing Sheets

ACTIVE POWER CONDITIONER

BACKGROUND OF THE INVENTION

1. Field of the Invention

The present invention relates to an active power conditioner and, specifically, to three power electronic switch sets within the active power conditioner, with one of them being switched in high frequency and the other two being switched in low frequency, so as to supply a high quality of power.

2. Description of the Related Art

Owing to the significant improvement of high technology industries, precision equipment is widely demanded in manufacturing processes of high technology industries, and high quality power is required for maintaining a normal operation for the equipment. Besides, the high quality power is also a prerequisite for computer related equipment that is broadly applied. Therefore, how to solve the power quality problems, such as: under voltage, over voltage, voltage spike, voltage distortion, etc., is an important topic for the consumers thereof.

Conventionally, a tap-changer autotransformer is used to solve the problems of under voltage and over voltage. The tap-changer autotransformer electrically connects between an AC power source and a load and provides the load with a stable output voltage by adjusting the taps thereof. However, there are some disadvantages, such as step regulation of the supply voltage, large installation volume, and inability in improvement of voltage distortion.

Figure 1:
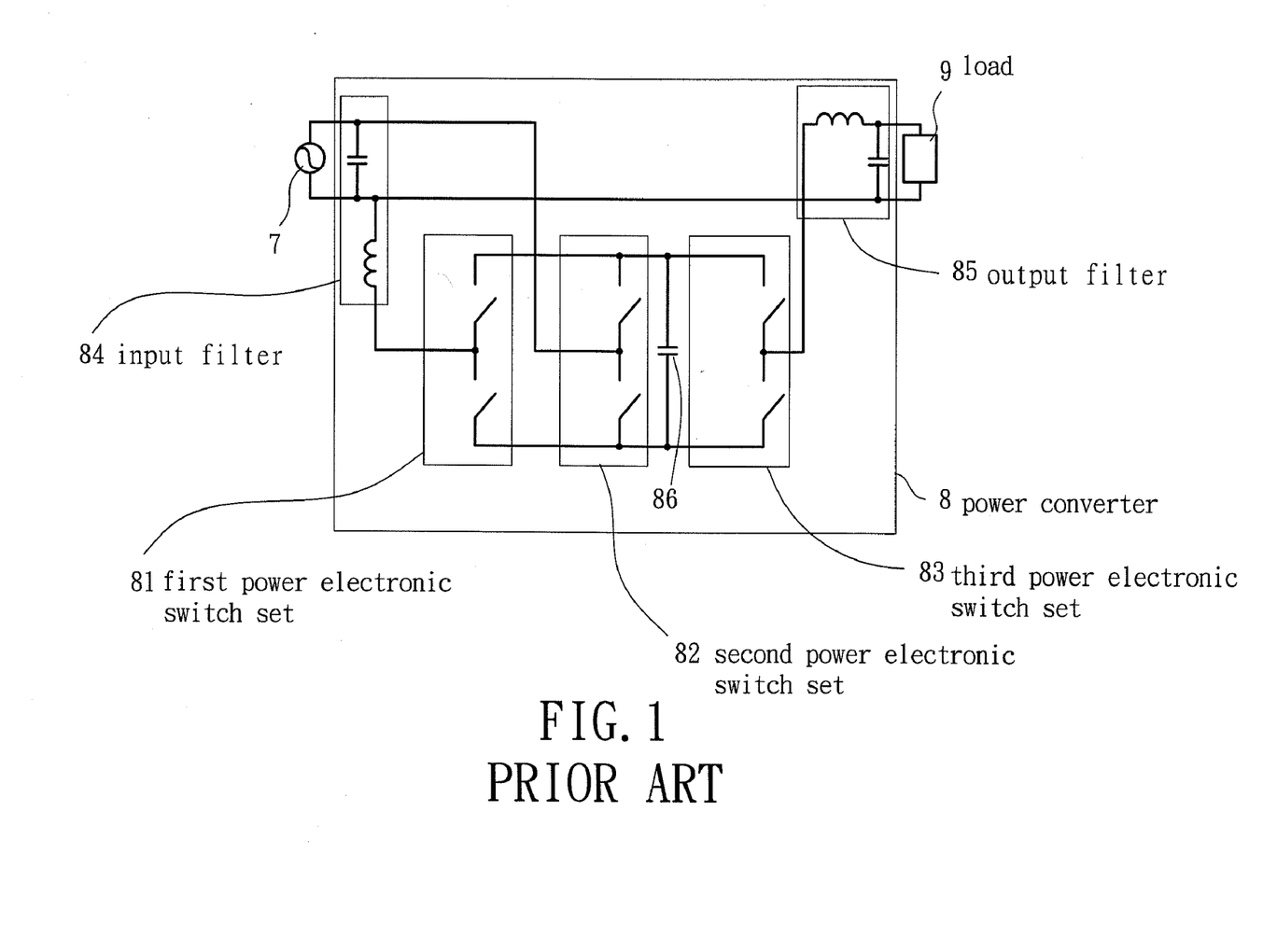
FIG. 1 is a schematic circuitry of a conventional active power conditioner in accordance with the prior art.

Recently, active power conditioners, such as the active power conditioner disclosed in U.S. Pat. No. 6,940,188 for example, were developed to overcome the problems of low power quality caused by unstable voltage from a power system. Referring initially to FIG. 1, a schematic circuitry of such active power conditioner is illustrated, which comprises an AC power source 7, a power converter 8, and a load 9. The power converter 8 electrically connects between the AC power source 7 and the load 9, so as to convert the unregulated voltage provided by the AC power source 7 into a regulated high quality voltage for the load 9.

The power converter 8 includes a first power electronic switch set 81, a second power electronic switch set 82, a third power electronic switch set 83, an input filter 84, an output filter 85, and a DC capacitor 86. Each of the power electronic switch sets 81, 82, 83 has two power electronic switches serially connecting with each other. The second power electronic switch set 82 and the third power electronic switch set 83 are jointly operated as a serial-type converter while the second power electronic switch set 82 and the first power electronic switch set 81 are jointly operated as a parallel-type converter. The DC capacitor 86 connects with and between said second and third power electronic switch sets 82, 83 in parallel. The input filter 84 connects between the AC power source 7 and the parallel-type converter. The output filter 85 connects between the serial-type converter and the load 9.

The DC capacitor 86 provides a stable DC voltage for the serial-type converter and the parallel-type converter such that both converters can be operated normally. The serial-type converter serially connects between the AC power source 7 and the load 9 to compensate the AC power source 7 for a voltage variation, so as to provide the load 9 with a stable AC power source. Furthermore, the parallel-type converter connects with the AC power source 7 in parallel, such that the stable DC voltage generated by the DC capacitor 86 is maintained. The input filter 84 and the output filter 85 are employed to filter out the harmonics caused by switching the parallel-type converter and the serial-type converter respectively in high frequency.

Still referring to FIG. 1, when a voltage variation of the AC power source 7 occurs, the serial-type converter converts the DC voltage supplied by the DC capacitor 86 into a AC voltage, so as to compensate the AC power source 7 for the voltage variation to obtain a regulated voltage at the load 9. Therefore, the load 9 may receive a stable AC voltage.

Nevertheless, such an active power conditioner still has some drawbacks in practical applications. For example, when the serial-type converter has to absorb or deliver energy to regulate the voltage applying to the load 9, the energy absorption or delivery can possibly result in a voltage variation of the DC capacitor 86. Consequently, in order to provide the serial-type converter with energy to compensate the AC power source 7 for the voltage variation, the parallel-type converter compensates the DC capacitor 86 for its DC voltage variation by charging or discharging the DC capacitor 86 through the AC power source 7.

Overall, after converting an AC power of the AC power source 7 into a DC power via the parallel-type converter and establishing the stable DC voltage across the DC capacitor 86, the serial-type converter produces a compensating voltage to serially inject the load 9 with said compensating voltage and the voltage of the AC power source 7. As a result, a high-capacitance DC capacitor has to be selected as the DC capacitor 86 for establishing the stable DC voltage. However, due to the high-capacitance of the DC capacitor 86, cost and volume for installation will increase, and reliability will decrease. Furthermore, when the conventional active power conditioner having the circuit topologies of the serial-type converter and parallel-type converter is operated, at least four power electronic switches, that is to say, two power electronic switch sets are controlled to switch in high frequency. This results in an increase of switching losses. In other words, the power efficiency of the active power conditioner will be reduced. Hence, there is a need in improvement of the conventional active power conditioner.

The present invention proposes an active power conditioner, which can provide a load with a stable voltage when a voltage variation occurs at a AC power source, so that the power quality at the load is improved. Furthermore, the DC capacitor of the conventional active power conditioner is omitted from the active power conditioner of the present invention. Consequently, it has advantages in reduced installation cost and volume and increased reliability. In addition, in operation of the active power conditioner, there is only a power electronic switch set being controlled to switch in high frequency, and the other power electronic switch sets are switched in low frequency. Thereby, the switching losses of the active power conditioner can be reduced, and the power efficiency thereof can also be relatively increased.

SUMMARY OF THE INVENTION

The primary objective of this invention is to provide an active power conditioner. The active power conditioner, configured by a plurality of power electronic switch sets, connects with a load in series and, then, connects with an AC power source in parallel. Some of the power electronic switches are switched via high-frequency switching, while others of the power electronic switches are switched via low-frequency switching. Therefore, when a voltage variation occurs at an AC power source, the DC voltage stability of the load can be maintained.

Moreover, according to the present active power conditioner, power electronic switches controlled via high-frequency switching are less than those of a conventional active power conditioner, and the DC capacitor is not needed for the present active power conditioner. Consequently, the present invention effectively reduces the cost and volume for installation and increases efficiency, reliability, and lifetime of the active power conditioner.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 2:
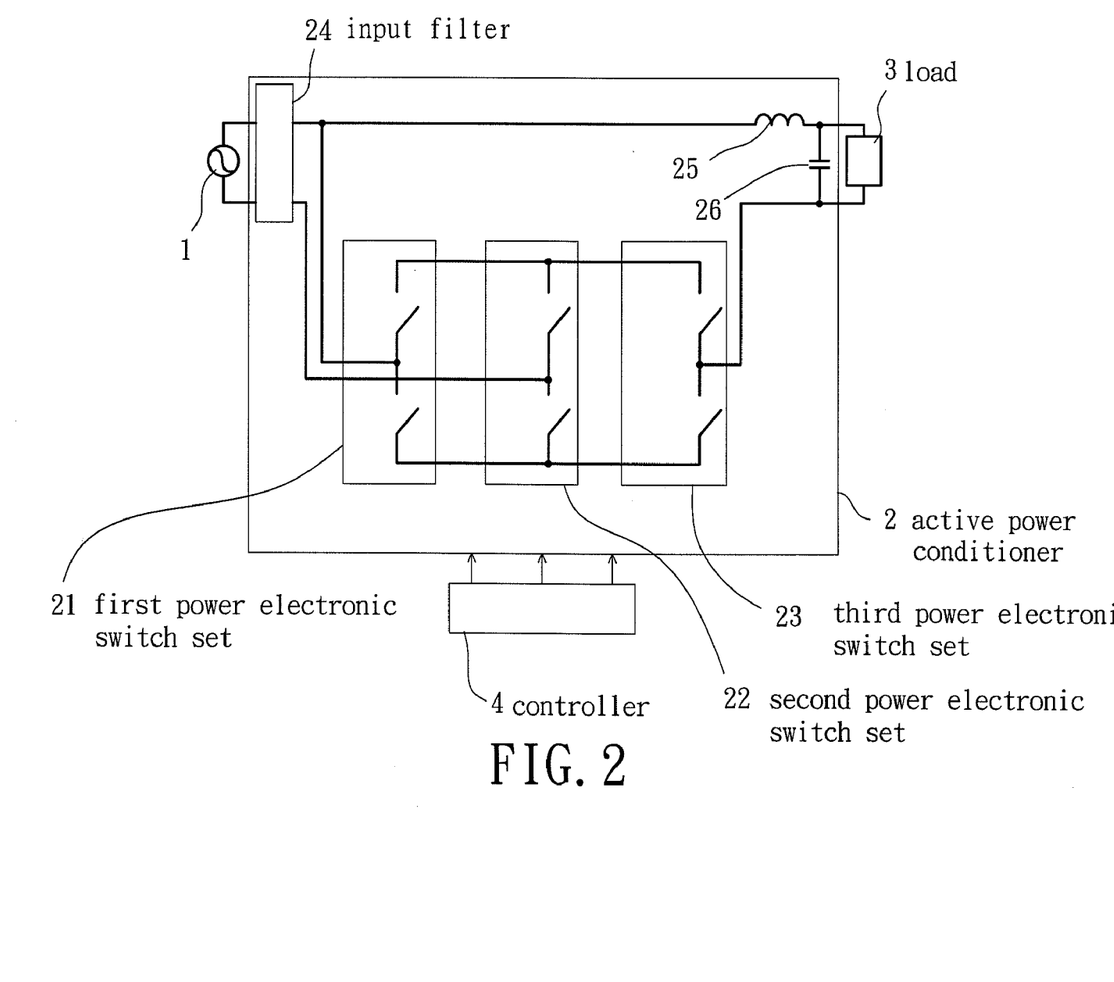
FIG. 2 is a schematic circuitry of an active power conditioner in accordance with a first embodiment of the present invention.

Referring to FIG. 2, a schematic circuitry of an active power conditioner in accordance with a first embodiment of the present invention is illustrated. An AC power source 1 supplies an active power conditioner 2 and a load 3 with power, with the active power conditioner 2 serially connecting to the load 3. The AC power source 1 and the load 3 both have two terminals: a first terminal and a second terminal. Through the operation of the active power conditioner 2, a predetermined and regulated voltage is generated for the load 3. Moreover, a controller 4 is utilized to control the active power conditioner 2.

The active power conditioner 2 comprises a first power electronic switch set 21, a second power electronic switch set 22, a third power electronic switch set 23, an input filter 24, an output inductor 25, and an output capacitor 26. Each of the power electronic switch sets 21, 22, 23 has two power electronic switches serially connected with each other and thereby forms a connected point between the two power electronic switches. That is, the first, second and third power electronic switch sets 21, 22, 23 have a first connected point, a second connected point, and a third connected point respectively. In detail, each of the power electronic switches includes a controllable switch element and a flywheel diode, which are connected in parallel. The three power electronic switch sets connect with each other in parallel through top and down terminals of each power electronic switch set.

The controller 4 detects respective voltages of the AC power source 1 and load 3 to correspondingly generate a set of driving signals and, then, send to and drive the three power electronic switch sets 21, 22, 23 of the active power conditioner 2. Operation of the three power electronic switch sets 21, 22, 23 shall be described in detail below. Either the second power electronic switch set 22 or the third power electronic switch 23 is controlled via high-frequency switching as the AC voltage of the AC power source 1 is lower or higher than the predetermined voltage. Furthermore, the power electronic switch sets which are not switched in high frequency, namely the first and third power electronic switch sets 21, 23 or the first and second power electronic switch sets 21, 22, are controlled via low-frequency switching, that is, the frequency of the power source 1. Accordingly, by the operation of the three power electronic switch sets 21, 22, 23, a stable voltage across the load 3, namely a load voltage, is provided.

Still referring to FIG. 2, the input filter 24 has an input side and an output side. The input side provides a first input terminal and a second input terminal, while the output side provides a first output terminal and a second output terminal. The first and second input terminals of the input filter 24 respectively connect to the first and second terminals of the AC power source 1 for filtering out high-frequency harmonic currents produced by switching operation of the power electronic switches. The output inductor 25 and the output capacitor 26 are formed as an output filter, with the output inductor 25 and the output capacitor 26 both having a first terminal and a second terminal and the output capacitor 26 connected in parallel with the load 3. Moreover, the first terminals of the output inductor 25, the output capacitor 26, and the load 3 are coupled together. The second terminal of the output inductor 25 is connected with the first output terminal of the input filter 24, and the second terminals of the output capacitor 26 and the load 3 are both coupled with the third connected point of the third power electronic switch set 23. According to the aforementioned connection topologies, the output filter formed by the output inductor 25 and output capacitor 26 can filter out harmonic voltages produced by switching operation of the power electronic switches.

Figure 3A:
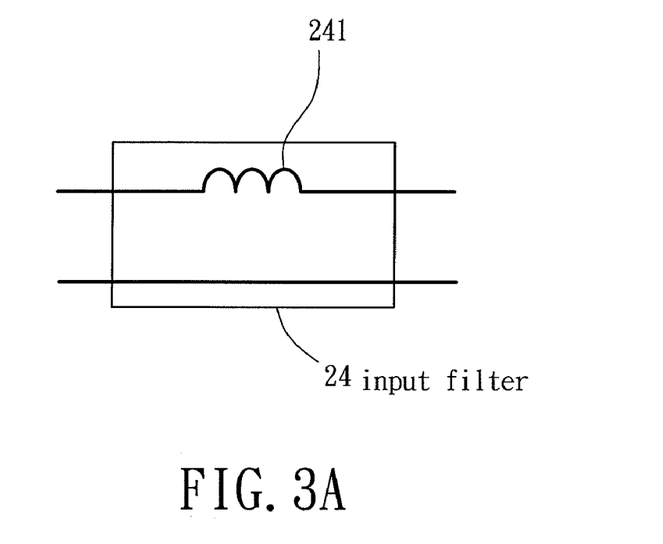
FIG. 3A is an input filter circuitry of the active power conditioner in FIG. 2 in accordance with the first embodiment of the present invention.
Figure 3B:
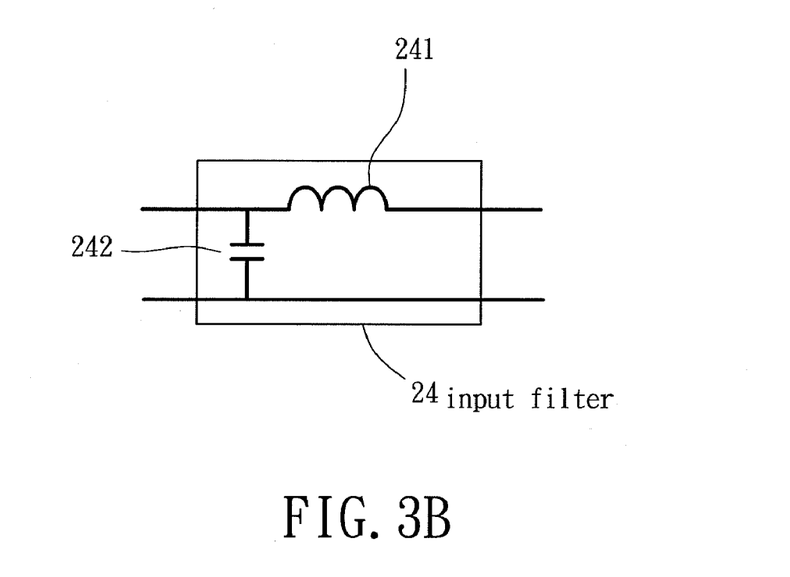
FIG. 3B is another input filter circuitry of the active power conditioner in FIG. 2 in accordance with the first embodiment of the present invention.

FIGS. 3A and 3B illustrate that the input filter 24 has two different configuration circuits. As shown in FIG. 3A, the input filter 24 is substantially an inductor 241 serially connected between the first input terminal and the first output terminal of the input filter 24. That is, the inductor 241 is serially connected between the first terminal of the AC power source 1 and the second terminal of the output inductor 25. Additionally, the second input terminal of the input filter 24 is directly connected with the second output terminal thereof. Another form of circuitry configuration of the input filter 24 illustrated in FIG. 3B shows that the input filter 24 further comprises a capacitor 242. With the inductor 241 still connected between the first terminal of the AC power source 1 and the second terminal of the output inductor 25, the capacitor 242 is connected between the first input terminal and the second input terminal of the input filter 24. That is, the capacitor 242 is connected with the AC power source 1 in parallel.

Referring back to FIG. 2, the first connected point of the first power electronic switch set 21 connects to the first output terminal of the input filter 24. The second connected point of the second power electronic switch set 22 connects to the second output terminal of the input filter 24. The third connected point of the third power electronic switch set 23 is coupled with the second terminals of the output capacitor 26 and the load 3.

In the circuitry configuration of the parallel-connected power electronic switch sets 21, 22, 23, a regulated AC load voltage over the load 3 can be achieved by merely switching the power electronic switch sets 21, 22, 23, and a DC capacitor is not needed for energy buffering and DC voltage stabilization.

In the first embodiment, when the AC voltage supplied by the AC power source 1 is lower than the predetermined voltage of the load 3, the active power conditioner 2 has to be operated in a boost mode. Inevitably, the first and third power electronic switch sets 21, 23 are controlled by a low-frequency square waveform, but the second power electronic switch set 22 is controlled by a high-frequency PWM waveform. Preferably, the frequency of the low-frequency square waveform approximates that of the AC power source 1. Accordingly, the first power electronic switch set 21 is used to rectify the AC voltage of the AC power source 1 in full-wave rectification way. Furthermore, the second power electronic switch set 22 is preferably controlled by the high-frequency PWM waveform, so as to build up a compensation voltage between the second and third connected points of the second and third power electronic switch sets 22, 23. Consequently, a boost voltage formed by the voltage of the power source 1 plus the compensation voltage can be supplied to the load 3.

When the AC voltage supplied by the AC power source 1 is higher than the predetermined voltage of the load 3, the active power conditioner 2 has to be operated in a buck mode. Inevitably, the first and second power electronic switch sets 21, 22 are controlled by a low-frequency square waveform, but the third power electronic switch set 23 is controlled by a high-frequency PWM waveform. Preferably, the frequency of the low-frequency square waveform also approximates that of the AC power source 1. Through the above operation, the combination of the second and third power electronic switch sets 22, 23 are equivalent to an AC switch, which serially connects between the AC power source 1 and the load 3.

On the one hand, when upper-side power electronic switches or down-side power electronic switches of the second and third power electronic switch sets 22, 23 are simultaneously on, the equivalent AC switch is on. Thereby, the AC voltage of the AC power source 1 is directly supplied to the output filter configured by the output inductor 25 and the output capacitor 26 through the input filtering circuit 24; that is, an input voltage of the output filter is nearly equal to the AC voltage of the AC power source 1. On the other hand, when switching states of the upper-side power electronic switches or the down-side power electronic switches of the second and third power electronic switch sets 22, 23 are complementary, the equivalent AC switch is off. Thereby, the second terminal of the output inductor 25 connects to the second terminal of the output capacitor 26 through the first and third power electronic switch sets 21, 23; that is, the input voltage of said output filter approximates zero.

The operation of the parallel-connected power electronic switch sets 21, 22, 23 is similar to that of an AC chopper, which generates a pulsating serial voltage across the output filtering circuit. The pulsating serial voltage switches between the AC voltage of the AC power source 1 and zero. An average value of the pulsating serial voltage, namely the AC voltage of the AC power source 1 multiplied by the duty ratio of said equivalent AC switch, equals the load voltage across the load 3. Because the duty ratio of said equivalent AC switch is always less than one, the load voltage of the load 3 is smaller than the AC voltage of the AC power source 1, and thereby a buck voltage is provided.

Figure 4:
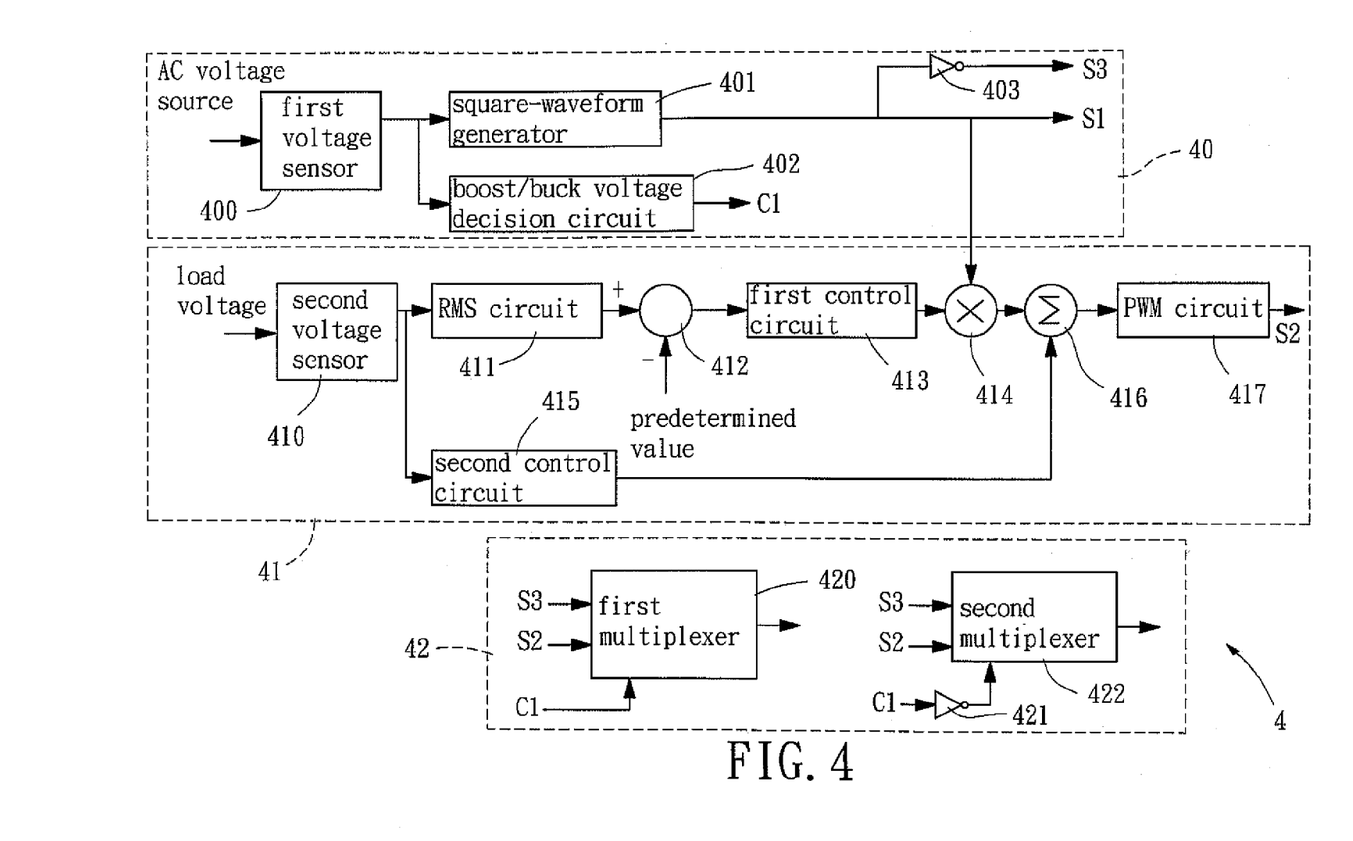
FIG. 4 is a control diagram of the active power conditioner in accordance with the first embodiment of the present invention.

Now referring to FIG. 4, a control diagram of the controller 4 in accordance with the first embodiment of the present invention is illustrated. The controller 4 comprises an AC voltage processing unit 40, a load voltage processing unit 41 and a selecting unit 42. The AC voltage processing unit 40 senses the AC voltage of the AC power source 1 and generates signals S1, S3, and the load voltage processing unit 41 senses the load voltage of the load 3 and generates a signal S2. The selecting unit 42 decides that the signal S2 or the signal S3 should be sent to the second power electronic switch set 22 and third power electronic switch set 23. The AC voltage source processing unit 40 comprises a first voltage sensor 400, a square-waveform generator 401, a boost/buck voltage decision circuit 402 and a NOT gate 403. The load voltage processing unit 41 comprises a second voltage sensor 410, a RMS (root mean square) circuit 411, a subtractor 412, a first control circuit 413, a multiplier 414, a second control circuit 415, an adder 416, and a PWM (pulse width modulation) circuit 417. The selecting unit 42 comprises a first multiplexer 420, a NOT gate 421, and a second multiplexer 422.

The first voltage sensor 400 of the AC voltage processing unit 40 detects the AC voltage of the AC power source 1 and transmits a signal to the square-waveform generator 401. The square-waveform signal S1 generated by the square-waveform generator 401 is transmitted to the NOT gate 403, which has a phase identical with that of the AC voltage of the AC power source 1. The square-waveform signal S1 is sent to be a driving signal of the first power electronic switch set 21 directly. Then, the NOT gate 403 outputs the inverse square-waveform signal S3, with the phase of which being opposite to that of the AC voltage source 1. Moreover, the outputted signal of the first voltage sensor 400 is also transmitted to the boost/buck voltage decision circuit 402, so as to generate a boost/buck control signal c1. In operation, when the AC voltage of the AC voltage source 1 is higher than the predetermined voltage, the boost/buck control signal c1 is LOW, and the AC voltage of the AC voltage source 1 is supposed to be lowered. Otherwise, when the AC voltage of the AC voltage source 1 is lower than the predetermined voltage, the boost/buck control signal c1 is HIGH, and the AC voltage of the AC voltage source 1 is supposed to be raised.

Still referring to FIG. 4, the second voltage sensor 410 of the load voltage processing unit 41 detects the load voltage of the load 3 and transmits a signal to the RMS circuit 411 to obtain a RMS value of the load voltage. The RMS value is sent to the subtractor 412 for subtracting a predetermined value from the RMS value, and the result of the subtraction is further sent from the subtractor 412 to the first control circuit 413. An output signal of the first control circuit 413 and the square-waveform signal S1 are transmitted to the multiplier 414 to obtain an adjustable square-waveform signal. In detail, the amplitude of the adjustable square-waveform signal is adjustable, which settles the duty ratio of the second power electronic switch set 22 or third power electronic switch set 23. According to the described procedures, with a close loop control, the RMS value is able to track the predetermined value through the adjustment in the amplitude of the adjustable square-waveform signal generated by the multiplier 414.

In a normal condition, the RMS value of the load voltage must track the predetermined value, and the demanded duty ratio of the second power electronic switch set 22 or third power electronic switch set 23 is a constant. However, a distortion of the load voltage will appear when the load 3 is a nonlinear load. In order to avoid the appearance of the distortion of the load voltage, the output signal of the second voltage sensor 410 is also transmitted to the second control circuit 415 to produce a waveform-modifying signal. The adder 416 receives the adjustable square-waveform signal and the waveform-modifying signal respectively generated by the multiplier 414 and the second control circuit 415 and sends an output signal to the PWM circuit 417 to produce the high-frequency PWM signal S2. Moreover, as a control signal of the first power electronic switch set 21, the square-waveform signal S1 is sent thereto.

Referring to FIG. 4 again, the high-frequency PWM signal S2 and the inverse square-waveform signal S3 are sent respectively to input pins of the first multiplexer 420, and the boost/buck control signal c1 is sent to a select input pin of the first multiplexer 420. Also, an output of the first multiplexer 420 is adapted to be a driving signal of the second power electronic switch set 22. When the boost/buck control signal c1 is LOW, the AC voltage source 1 is supposed to be under voltage, and the first multiplexer 420 outputs the inverse square-waveform signal S3. On the contrary, when the boost/buck control signal c1 is HIGH, the AC voltage source 1 is supposed to be over voltage, and the first multiplexer 420 outputs the high-frequency PWM signal S2.

Furthermore, the high-frequency PWM signal S2 and the inverse square-waveform signal S3 are also sent respectively to the input pins of the second multiplexer 422, and the boost/buck control signal c1 is sent to a select input pin of the second multiplexer 422 through the NOT gate 421. Besides, an output of the second multiplexer 422 is adapted to be a driving signal of the third power electronic switch set 23. When the boost/buck control signal c1 is LOW, the AC voltage source 1 is supposed to be under voltage, and the second multiplexer 422 outputs the high-frequency PWM signal S2. On the contrary, when the boost/buck control signal c1 is HIGH, the AC voltage source 1 is supposed to be over voltage, and the second multiplexer 422 outputs the inverse square-waveform signal S3.

Figure 5:
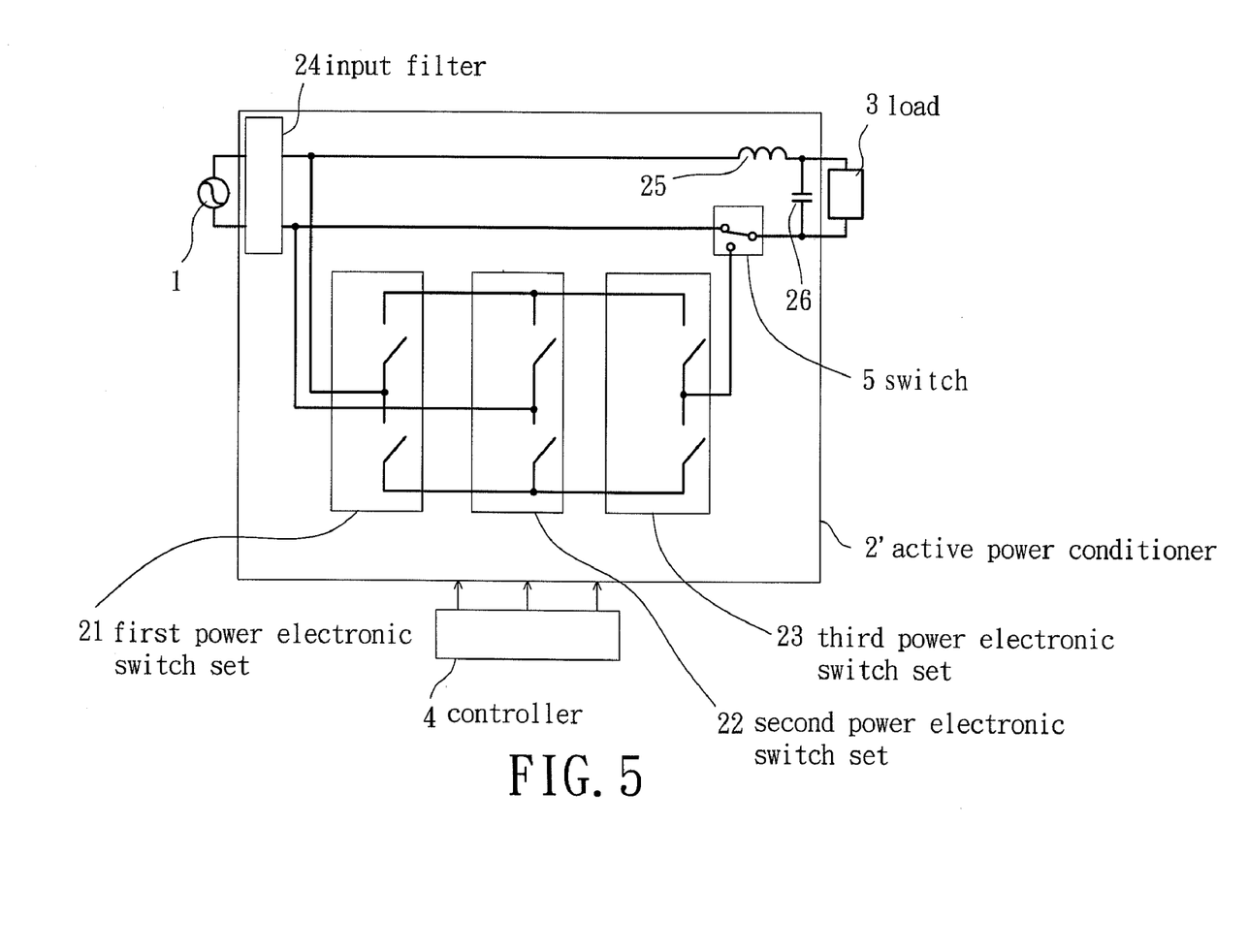
FIG. 5 is a schematic circuitry of an active power conditioner in accordance with a second embodiment of the present invention.

Turning now to FIG. 5, a schematic circuitry of an active power conditioner 2' in accordance with a second embodiment of the present invention is illustrated. In comparison with the first embodiment, the active power conditioner 2' in the second embodiment further comprises a switch 5. Said switch 5 can be a mechanical switch or a solid state switch, which has a common terminal, a first terminal and a second terminal. The common terminal connects to a conjunction of the second terminals of the output capacitor 26 and load 3. The first terminal of the switch 5 connects to the second output terminal of the input filter 24. The second terminal of the switch 5 connects to the third connected point of the third power electronic switch set 23.

Still referring to FIG. 5, if the AC voltage of the AC power source 1 varies within a tolerable range of the predetermined voltage of the load 3, the common and first terminals of the switch 5 are linked with each other. Thereby, the second output terminal of the input filter 24 couples with the second terminal of the output capacitor 26, and the AC power source 1 supplies the load 3 with power through the input filter 24 and the output filter formed by the output inductor 25 and the output capacitor 26. On the contrary, if the AC voltage of the AC power source 1 varies and is out of the tolerable range of the predetermined voltage, the common and second terminals of the switch 5 are linked with each other. Therefore, the second terminal of the output capacitor 26 couples with the third connected point of the third power electronic switch sets 23, and therefore, the active power conditioner 2' is the same as the active power conditioner 2 in the first embodiment.

As has been discussed above, the conventional active power conditioner utilizes a high-capacitance DC capacitor, with the DC capacitor 86 providing a stable DC voltage, and with at least four power electronic switches of the conventional active power conditioner switched in high frequency. These cause disadvantages such as increased cost and volume for installation and decreased power efficiency. In accordance with the proposed active power conditioner 2 comprising three power electronic switch sets 21, 22, 23, either the second power electronic switch set 22 or the third power electronic switch 23 is controlled via high-frequency switching. The power electronic switch sets that are not switched in high frequency, namely the first and third power electronic switch sets 21, 23 or the first and second power electronic switch sets 21, 22, are controlled via low-frequency switching. As a result, only two power electronic switches at most are controlled in high frequency at any time, and other power electronic switches are controlled in low frequency. Besides, the high-capacitance DC capacitor employed in the conventional active power conditioner is not needed for the active power conditioner 2 of the present invention. Consequently, lower cost and volume for installation and increased efficiency are achieved.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. An active power conditioner, comprising:
   an input filter having an input side and an output side, with the input side connecting with a AC power source in parallel and the output side providing a first output terminal and a second output terminal;
   an output filter comprising an inductor and a capacitor, and both of the inductor and the capacitor having a first terminal and second terminal, said capacitor connected in parallel with a load through the first terminal and the second terminal thereof, said inductor engaging with the first terminal of the capacitor through the first terminal of the inductor and with the first output terminal of the input filter through the second terminal of the inductor;
   a first power electronic switch set comprising two serial-connected power electronic switches, with a first connected point being formed between the two power electronic switches and connecting to the first output terminal of the input filter, with the first power electronic switch set further comprising a top terminal and a down terminal at two ends thereof;
   a second power electronic switch set comprising two serial-connected power electronic switches, with a second connected point being formed between the two power electronic switches of the second power electronic switch set and connecting to the second output terminal of the input filter, with the second power electronic switch set further comprising a top terminal and a down terminal at two ends thereof;
   a third power electronic switch set comprising two serial-connected power electronic switches, with a third connected point being formed between the two power electronic switches of the third power electronic switch set and connecting to the second terminal of the capacitor, with the third power electronic switch set further comprising a top terminal and a down terminal at two ends thereof; and
   a controller generating a set of driving signals to control the power electronic switches within the first, second and third power electronic switch sets;
   wherein the three power electronic switch sets connect with each other in parallel through the top and down terminals, and one of the second and third power electronic switch sets is controlled via high-frequency switching and the other power electronic switch sets that are not switched in high frequency controlled to switch in low-frequency switching.

2. The active power conditioner as defined in claim 1, wherein the frequency of the low-frequency switching is equal to that of the AC power source.

3. The active power conditioner as defined in claim 1, wherein the first and third power electronic switch sets are controlled via low-frequency switching and the second power electronic switch set is controlled via high-frequency switching when an AC voltage supplied by the AC power source is lower than a predetermined voltage, and said first power electronic switch set rectifies the AC voltage in a full-wave rectification way, such that a compensation voltage is built up between the second and third connected points of the second and third power electronic switch sets and a boost voltage formed by the voltage of the power source plus the compensation voltage supplied to the load.

4. The active power conditioner as defined in claim 1, wherein the first and second power electronic switch sets are controlled via low-frequency switching and the third power electronic switch set is controlled via high-frequency switching when an AC voltage supplied by the AC power source is higher than a predetermined voltage, with said second and third power electronic switch sets connected forming an equivalent AC switch that serially connects between the AC power source and the load and functions as an AC chopper by turning on and off to generate a pulsating serial voltage, with an average value of the pulsating serial voltage being supplied to the load through the output filter.

5. The active power conditioner as defined in claim 1, wherein each of the power electronic switches comprises a controllable switch element and a flywheel diode, which are connected in parallel.

6. The active power conditioner as defined in claim 1, wherein the controller senses an AC voltage and a load voltage and correspondingly generates the set of driving signals.

7. The active power conditioner as defined in claim 6, wherein the controller consisted of an AC voltage processing unit, a load voltage processing unit and a selecting unit, with said the AC voltage processing unit and the load voltage processing unit sensing the AC voltage and load voltage respectively and generating the control signals, with said the selecting unit selecting and outputting the control signals to the second and third power electronic switch sets.

8. The active power conditioner as defined in claim 7, wherein the AC voltage processing unit comprises a first voltage sensor, a square-waveform generator, a NOT gate and a boost/buck voltage decision circuit, with the first voltage sensor detecting the AC voltage and transmitting a signal to the square-waveform generator to generate a square-waveform signal, with the NOT gate receiving the square-waveform signal and then outputting an inverse square-waveform signal, with said signal outputted by the first voltage sensor also being transmitted to the boost/buck voltage decision circuit for generating a boost/buck control signal, wherein the square-waveform signal is adapted to be a driving signal of the first power electronic switch set.

9. The active power conditioner as defined in claim 8, wherein the load voltage processing unit comprises a second voltage sensor, a RMS circuit, a subtractor, a first control circuit, a multiplier, a second control circuit, an adder, and a PWM circuit, with the second voltage sensor detecting the load voltage and transmitting a signal to the RMS circuit to obtain a RMS value of said load voltage, with the subtractor receiving said RMS value, subtracting a predetermined value from the RMS value, and sending the result of the subtraction to the first control circuit, with an output signal of the first control circuit and the square-waveform signal being transmitted to the multiplier to obtain an adjustable square-waveform signal, with the signal generated by the second voltage sensor also being transmitted to the second control circuit to produce a waveform-modifying signal, with the adder receiving and adding the adjustable square-waveform signal and the waveform-modifying signal and then sending an output signal to the PWM circuit to produce a high-frequency PWM signal.

10. The active power conditioner as defined in claim 7, wherein the selecting unit comprises a first multiplexer, a NOT gate, and a second multiplexer, with the high-frequency PWM signal and the inverse square-waveform signal being sent to input pins of the first multiplexer and the boost/buck control signal being sent to a select input pin of the first multiplexer for generating driving signals of the second power electronic switch set, with the high-frequency PWM signal and the inverse square-waveform signal being sent to input pins of the second multiplexer and the boost/buck control signal being sent to a select input pin of the second multiplexer through the NOT gate for generating driving signals of the third power electronic switch set.

11. An active power conditioner, comprising:
an input filter having an input side and an output side, with the input side connecting with a AC power source and the output side providing a first output terminal and a second output terminal;
an output filter comprising an inductor and a capacitor, with both of the inductor and the capacitor having a first terminal and second terminal, said capacitor connected in parallel to a load through the first terminal and the second terminal thereof, said inductor engaging with the first terminal of the capacitor through the first terminal thereof and with the first output terminal of the input filter through the second terminal thereof;
a first power electronic switch set comprising two serial-connected power electronic switches, with a first connected point being formed between the two power electronic switches and connecting to the first output terminal of the input filter, with the first power electronic switch set further comprising a top terminal and a down terminal at two ends thereof;
a second power electronic switch set comprising two serial-connected power electronic switches, with a second connected point being formed between the two power electronic switches of the second power electronic switch set and connecting to the second output terminal of the input filter, with the second power electronic switch set further comprising a top terminal and a down terminal at two ends thereof;
a third power electronic switch set comprising two serial-connected power electronic switches, with a third connected point being formed between the two power electronic switches of the third power electronic switch set, with the third power electronic switch set further comprising a top terminal and a down terminal at two ends thereof;
a switch having a common terminal, a first terminal and a second terminal, with the common terminal connecting to the second terminal of the capacitor of the output filter, the first terminal of the switch connecting to the second output terminal of the input filter, and the second terminal of the switch connecting to the third connected point of the third power electronic switch sets; and
a controller generating a set of driving signals to control the power electronic switches within the first, second and third power electronic switch sets;

wherein the three power electronic switch sets connect with each other in parallel through the top and down terminals;

wherein the common and first terminals of the switch are linked together when the AC voltage of the AC power source varies within a tolerable range of a predetermined voltage to let the AC power source supply the load with energy through the input filter and the output filter; wherein the common and second terminals of the switch are linked together when the AC voltage of the AC power source varies and is out of the tolerable range of the predetermined voltage to let the AC voltage of the AC power source be processed through the first, second and third power electronic switch sets to supply a regular voltage to the load.

12. The active power conditioner as defined in claim 11, wherein the switch is a mechanical switch or a solid state switch.

13. The active power conditioner as defined in claim 11, wherein the frequency of the low-frequency switching is equal to that of the AC power source.

14. The active power conditioner as defined in claim 11, wherein the first and third power electronic switch sets are controlled via low-frequency switching and the second power electronic switch set is controlled via high-frequency switching when an AC voltage of the AC power source is lower than the tolerable range of the predetermined voltage, and said first power electronic switch set rectifies the AC voltage in a full-wave rectification way, such that a compensation voltage is built between the second and third connected points of the second and third power electronic switch sets and a boost voltage formed by the AC voltage of the AC power source plus the compensation voltage supplied to the load.

15. The active power conditioner as defined in claim 11, wherein the first and second power electronic switch sets are controlled via low-frequency switching and the third power electronic switch set is controlled via high-frequency switching when an AC voltage supplied by the AC power source is higher than the tolerable range of the predetermined voltage, with said second and third power electronic switch sets connected forming an equivalent AC switch that serially connects between the AC power source and the load and functions as an AC chopper by turning on and off to generate a pulsating serial voltage, with an average value of the pulsating serial voltage being supplied to the load through the output filtering circuit.

16. The active power conditioner as defined in claim 11, wherein each of the power electronic switches comprises a controllable switch element and a flywheel diode, which are connected in parallel.

17. The active power conditioner as defined in claim 11, wherein the controller senses an AC voltage and a load voltage and correspondingly generates the set of driving signals.

* * * * *